May 29, 1923.
E. BYLUND
HOSE COUPLING
Filed Sept. 29, 1921
1,456,761
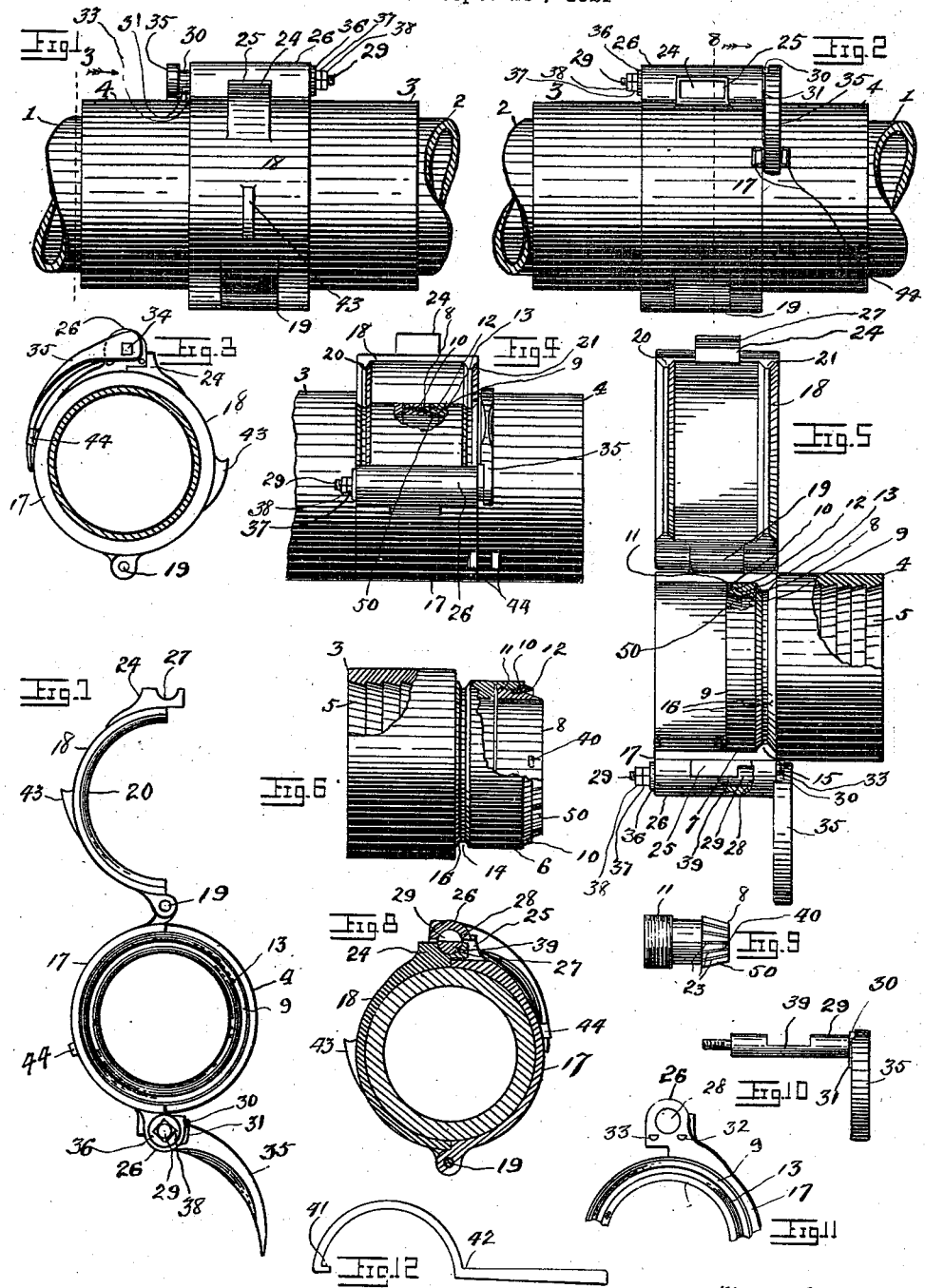
Inventor
Eric Bylund
By D. R. O'Neail
His Attorney Patented May 29, 1923.

1,456,761

UNITED STATES PATENT OFFICE.

ERIC BYLUND, OF WINNIPEG, MANITOBA, CANADA.

HOSE COUPLING.

Application filed September 29, 1921. Serial No. 504,239.

*To all whom it may concern:*

Be it known that I, ERIC BYLUND, a subject of the King of Great Britain, residing at the city of Winnipeg, in the Province of Manitoba, in the Dominion of Canada, have invented certain new and useful Improvements in Hose Couplings, of which the following is a specification.

This invention relates to improvements in couplings used to connect fire hose, garden hose, or other flexible fluid carriers, the object of the invention being to simplify and improve the construction of devices of this nature and the locking means connected therewith, so that great speed may be attained in the connection of a pair of hose sections by means of the device.

With this and certain other objects in view which will appear as the description proceeds, the invention resides in the novel construction and combination of parts hereinafter first fully described in the following specification and later more particularly pointed out in the appended claims, reference also being had to the drawings formig part hereof, in which similar characters of reference indicate similar parts throughout the different views, and in which—

Fig. 1 is a side elevation of the improved coupling as it would appear in its capacity as a connection between two lengths of hose, and as viewed from the side on which the latch enters the lock.

Fig. 2 is a view of the opposite side of the coupling from that shown in Fig. 1.

Fig. 3 is an end view of the coupling as indicated by the line 3 in Fig. 1.

Fig. 4 shows the coupling partially opened, portions of the meeting ends in the interior being broken away to show the manner of their connection.

Fig. 5 shows the coupling fully opened to receive the connecting member of a second length of hose.

Fig. 6 shows a second hose end ready to be placed in the coupling, portions of the structure being broken away to show the interior.

Fig. 7 is an end view of the coupling with the parts positioned as in Fig. 5.

Fig. 8 is a section through the coupling upon the line 8 in Fig. 2.

Fig. 9 is a view of the packing retainer apart from the rest of the structure.

Fig. 10 shows the locking bolt and the lever by which it is rotated.

Fig. 11 is a fragmentary end view of the locking portion of the device showing the bolt receiving socket.

Fig. 12 is a side elevation of the spanner used to remove the packing retainer from the end of the hose connection.

In the drawings 1 and 2 indicate sections of hose of any suitable material such as rubber or canvas, the extremities of the said hose being inserted in the ends of the metallic members 3 and 4 and so maintained by a ring placed in the hose and expanded to force the said hose into gripping contact with the circular serrations 5 on the interiors of the respective member, the said members thereafter becoming the ends of the hose sections.

The connection of the hose sections with the metallic members as described, is common in the art and it has not been thought necessary to more fully show it in the drawings.

The members 3 and 4 it will be observed, are of reduced diameter for that portion of their lengths indicated respectively as 6 and 7, the extremities 8 and 9 of the reduced portions being respectively of male and female conical formation, the extremity 8 of the portion 6 being however, a separate piece and shaped to constitute a retainer for a ring packing 10, the end of the metallic portion 7 being of female conical shape in order to receive the member 8 and the packing around the conical part thereof, the relationship of the members 8 and 6 being disengageably maintained by interengaging screw-threads as at 11.

The packing 10 is interiorly and exteriorly bevelled to provided a forward projection 12 adapted to enter a groove 13 formed around the opening in the end of the portion 7 of the device when the parts are brought together.

The portions 6 and 7 of the hose ends 3 and 4 are circumferentially grooved as at 14 and 15 respectively, the sides 16 of the grooves being bevelled in as shown, and a locking member formed from two semi-cylindrical members 17 and 18, hinged together as at 19 is adapted to be closed around, or to embrace the portions 6 and 7 to form the coupling connection.

The semi-cylindrical member 17 is preferably permanently secured to the part 7 of the member 4, and the member 18 is formed with a pair of spaced ribs or ridges 20 and 21 adapted, when the ends 6 and 7 are brought together and the said member 18 closed around them, to enter the respective grooves 14 and 15, and, by reason of the bevelled or sloped sides of the said ribs and grooves, give to the member 3 an axial displacement calculated to bring the portion 12 of the packing member 10 into intimate relationship with the groove 13 in the end of the portion 7 of the member 4 to form a fluid tight joint.

The reduction in the diameter of the portions 6 and 7 of the members 3 and 4 is accounted for by the thickness of the locking members 17 and 18, so that the coupling is of uniform outer diameter when closed except for the projection of the hinge 19 and the locking feature.

The tapered portion of the packing retainer, (best shown in Fig. 9) which may be indicated as 50, may be provided with longitudinally extending grooves 23, by which fluid under pressure from within the hose may reach the inner periphery of the packing 10 to expand the same outwardly in the groove 13, to still further ensure the tightness of the joint.

The locking feature comprises a latch or keeper 24 formed on the outer side of the member 18 and extending past the extremity of the said member so that it may enter an opening 25 through the lock casing 26 formed on the portion 17 of the coupling. The member 24 has a lateral groove 27 formed in its outer face, the said groove coming approximately centrally of the opening 25 when the member 18 is in closed position.

The lock casing 26 is formed with a bore 28 therethrough directed lengthwise of the coupling, the bore encroaching upon the space or opening 25 for approximately half the diameter of the said bore. A bolt 29 is rotatively mounted in the bore 28, the bolt having a substantially rectangular head 30 with an elongation 31 on one side, the sides of the elongation being adapted to contact with the studs 32 and 33 set in the end of the casing 26 which act as stops to prevent rotation of the bolt 29 beyond a half turn in either direction. The head of the bolt 29 is further provided with a rectangular projection 34 upon which is secured a lever 35 by means of which the bolt 29 may be rotated into the groove 27 in the latch 24 to lock the coupling, or in the other direction to release the latch, the locking becoming possible by reason of the shape of the bolt as hereinafter described.

36 indicates a washer on the end of the bolt 29 opposite the head 30, while 37 and 38 are jam nuts on the same.

The bolt 29 is cut away for half its thickness, at a point in its length adapted to register with the opening 25 in the member 26, the reduced portion or rebate 39 of the bolt being so located with relation to the head 30 as to be entirely within the thickness of the top of the casing 26 and clear of the opening 25 when the lever 35 is in the position shown in Figs. 4, 5 and 7.

It will now be observed that as there is no ridge in that portion of the member 17 wherein is received the portion 6 of the member 3, no difficulty is experienced in quickly positioning the said portion 6 in place end to end with the part 7 of the member 4, this being done, the locking member 18 is closed around the said portions 6 and 7, the latch 24 thereon entering the opening 25 in the member 26. The bolt 29 is next rotated by means of the lever 35 until the side of the extension 31 on the head 30 comes into contact with the stud 32, when, the rebate 39 of the bolt 29 being in the groove 27 in the latch 24, the coupling is securely locked.

40 indicates an opening formed in the tapered portion 50 of the packing retainer to receive the hook 41 on the spanner 42 when it is desired to remove the said packing retainer to renew the packing.

43 is a finger grip by means of which the member 18 may be rotated on its hinge 19 when the coupling members are to be disconnected.

44 and 44 indicate spaced projections on the members 4 and 17 between which the lever 35 comes to rest when the coupling is in locked position, the projections guarding against accidental dislodgment of the lever.

From the foregoing description it will be seen that the connection of the ends 3 and 4, due to the absence of either ridges or grooves in that part of the member 17 wherein is received the end 6 of the member 3, is made both rapid and easy, and that as the opening 25 passes entirely through the member 26, should there at any time be any obstruction in the said opening, such for instance as ice or snow, when the member 18 is brought rapidly into locking position the said obstruction would be immediately forced through the said opening by the latch 24 and out of the same on the other side.

In practice the lever operated circumferentially deficient locking bolt has proven satisfactory in every respect for the purpose for which it is used.

Having thus fully described my said invention, what I claim is—

1. In a hose coupling in combination, a pair of coupling members having a peripherally grooved portion of each of reduced diameter of male and female conical formation respectively; two semi-cylindrical hinge-connected members adapted to embrace the reduced portions of the coupling members provided on their internal surfaces with ridges adapted to enter the grooves on the coupling members when the said hinge-connected members are closed around them, and locking means on the hinge-connected members whereby they are maintained in closed position, said locking means comprising a grooved keeper on one hinge-connected member, a lock on the other hinge-connected member having an opening therethrough to receive the keeper, a bolt mounted for restricted rotation in the lock crossing the opening and having a flat side to permit entrance of the keeper into the opening, semi-rotation of the bolt serving to place the rounded side thereof in the groove in the keeper to lock the coupling.

2. A hose coupling in which is comprised a pair of coupling members having inter-connecting ends; two semi-cylindrical hinge-connected members adapted to embrace the coupling members; means on the hinge-connected and coupling members adapted to interengage when the hinge-connected members are closed around the coupling members; a lock comprising a grooved latch on one of the hinge-connected members and a projection on the other hinge-connected member having an opening therethrough to receive the latch, a bolt mounted in the projection encroaching upon the opening and having a missing portion in register therewith to permit entrance of the latch, and means to rotate the bolt to bring the rounded portion thereof into the groove in the latch to lock the coupling.

3. A hose coupling comprising a pair of coupling members; two semi-cylindrical hinge-connected members adapted to embrace the coupling members; means on the hinge-connected and coupling members interengageable when the hinge-connected members are closed around the coupling members; a grooved latch on one of the hinge-connected members and a rotatable bolt on the other hinge-connected member having a flat side to allow the latch to pass thereunder and a rounded side to engage in the groove in the latch upon rotation of the bolt.

4. A hose coupling comprising a pair of coupling members; two hinge-connected members of semi-cylindrical formation adapted to embrace the coupling members; means on the hinge-connected and coupling members interengageable when the hinge-connected members are closed around the coupling members; a grooved latch on one of the hinge-connected members; a rotatable bolt on the other hinge-connected member having a flat side and a rounded side, the flat side permitting the latch to pass under the bolt, and a lever rigidly secured to the bolt whereby the said bolt may be rotated to engage the rounded side of the bolt in the groove in the latch to lock the coupling.

In testimony whereof, I affix my signature.

ERIC BYLUND.